United States Patent Office 3,558,557
Patented Jan. 26, 1971

3,558,557
COPOLYESTERS, THEIR PRODUCTION AND USES
Josef Hrach, Winfried Zeschmar, Gottfried Morawetz, and Dominik Mach, Kufstein, Austria, assignors, by mesne assignments, to Sandoz Ltd., Basel, Switzerland, a corporation of Switzerland
No Drawing. Filed Oct. 6, 1967, Ser. No. 673,302
Claims priority, application Austria, Oct. 10, 1966,
A 9,476/66
Int. Cl. C08f 5/00, 7/10
U.S. Cl. 260—47                                   7 Claims

ABSTRACT OF THE DISCLOSURE

The invention relates to thermoplastic copolyesters composed of the radicals of aromatic dicarboxylic acids (a), aliphatic or alicyclic dioles (b), the oxalkylation products of compounds having two phenolic hydroxyl groups in the molecule (c) and compounds with more than two carboxylic acid groups or aliphatic hydroxyl groups in the molecule (d), which are highly suitable for the manufacture of fibres, filaments, films or moulded products.

---

Copolyesters produced with aromatic dicarboxylic acids such as terephthalic acid, aliphatic or alicyclic dioles such as ethylene glycol, and other polyester forming compounds, e.g. the oxethylation products of compounds with two phenolic hydroxyl groups in the molecule, such as 4,4'-dihydroxydiphenyl-dimethylmethane (bis-phenol A), are known products. The fibres spun from these have very high shrinkage values at boiling temperature and possess good dyeability, but in comparison with polyethylene terephthalate they have lower dry tenacity and relative wet tenacity and relatively poor heat stability. Other copolyesters, weakly cross linked or branched, are known which are obtained from aromatic dicarboxylic acids, aliphatic or alicyclic dioles and compounds bearing more than two carboxyl groups or aliphatic hydroxyl groups in the molecule, e.g. glycerin, pentaerythrite, trimellitic and pyromellitic acid. As the extent of cross linking or branching is increased, the processability of these copolyesters, particularly the melt spinning properties, grows progressively poorer and the filaments exhibit inferior drawability.

It has been found that copolyesters formed with aromatic dicarboxylic acids (a), aliphatic or alicyclic dioles (b), the oxalkylation products of compounds having two phenolic hydroxyl groups in the molecule (c) and compounds with more than two carboxylic groups or aliphatic hydroxyl groups in the molecule (d) represent an improvement in those properties of the two known copolyester types which are less satisfactory, while at the same time they combine the good properties of both. They show excellent processing behaviour, as for example in melt spinning with subsequent cold drawing of the filament, and in injection and extrusion moulding. The filaments exhibit very good dry and wet tenacity and similarly good pilling resistance and shape stability. They are readily dyeable and heat stable. The elasticity properties, in particular the initial modulus, are only slightly temperature dependent, and the stretch recovery, evaluated by the ASTM method at 5% elongation, is good, especially at temperatures above room temperature. The residual shrinkage, for instance in dry heat setting at 160° C. and constant length, is slight, although the shrinkage behaviour may be varied before setting if desired by using an appropriate processing technique.

The process for the production of these new copolyesters consists in polycondensation of aromatic dicarboxylic acids (a) or their polyester-forming derivatives, aliphatic or alicyclic dioles (b), the ovalkylation products of compounds having two phenolic hydroxyl groups in the molecule (c) and compounds with more than two aliphatic hydroxyl groups or more than two carboxylic acid groups or their polyester-forming derivatives in the molecule (d).

Polyester-forming derivatives of the named acids are, among others, the esters of low molecular alcohols e.g. methyl, ethyl or propyl alcohol, or the acid halogenides, in particular the chlorides or bromides.

These new copolyesters may contain one or more compounds of each of the four groups of components. Of the aromatic dicarboxylic acids (a), terephthalic acid is preferred; others of interest include isophthalic acid, 2,6-naphthalenedicarboxylic acid, 4,4'-diphenyldicarboxylic acid, 2,5-dimethoxyterephthalic acid and mixtures of these acids.

Aliphatic dioles (b) of particular importance are those of the general formula $HO(CXY)_nOH$ where X and Y, independently of each other, stand for hydrogen or lower alkyl with 1 to 4 carbon atoms and $n$ is a whole number from 2 to 10. First among these is ethylene glycol. Others which may be named as examples are 1,4-butandiole, 1,2-propanediole and 2-methylpentandiole-1,5. A particularly valuable alicyclic diole is 1,4-bis-(hydroxymethyl)-cyclohexane. Mixtures of dioles also are important.

As oxalkylation products of compounds with two phenolic hydroxyl groups in the molecule (c), special importance attaches to the oxethylation products of these compounds. These may have, for example, one of the following formulae:

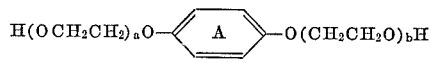

or

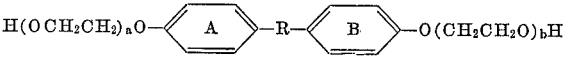

where $a$ and $b$, independently of each other, are whole numbers from 1 to 10, R stands for the direct linkage or a bridge member, and the nuclei A and B may be further substituted. When R denotes a bridge member this is preferably one of the following: a divalent saturated aliphatic hydrocarbon group having 1 to 6 carbon atoms, a divalent saturated cycloaliphatic hydrocarbon group of 5 to 7 carbon atoms,

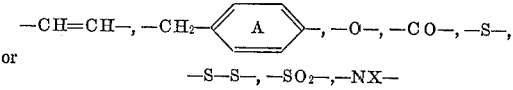

or

—S—S—, —SO$_2$—, —NX— where X stands for hydrogen or lower alkyl bearing 1 to 4 carbon atoms. The rings A and B may be substituted, e.g. by lower, if desired branched alkyl having 1 to 4 carbon atoms, or by halogen (fluorine, chlorine, bromine) or nitro groups. A particular valuable reaction product is that obtained with one mole bis-phenol A and a few moles ethylene oxide, for example bis-phenol-A-diglycolether.

The most interesting compounds having more than two carboxyl groups or aliphatic hydroxyl groups in the molecule (d) are the aromatic tricarboxylic and tetracarboxylic acids, above all the benzenetricarboxylic and benzenetetracarboxylic acids; e.g. trimellitic and pyromellitic acid and aliphatic alcohols having 3 or 4 hydrovyl groups, e.g., glycerol and pentaerythritol. The suitable range includes further erythritol, arabitol, mannitol and sorbitol, and as compounds with more than two carboxyl and hydroxyl groups malic acid, citric acid and tartaric acid. The oxalkylation products of trivalent and multivalent phenols are also of importance, e.g. the glycol ethers of phloroglycine and pyrogallol.

The aforestated components are preferably present in the new products in a given quantitative ratio, i.e. up to 40 mol percent or more particularly 10 mol percent of one or more compounds (c) to maximum 3 mol percent or preferably 1 mol percent of one or more compounds (d), in each case in relation to the aromatic dicarboxylic acids. A particularly valuable copolyester consists of terephthalic acid, ethylene glycol or 1,4-bis-(hydroxymethyl)-cyclohexane, bis-phenol-A-diglycol ether and pentaerythritol in a ratio within the aforestated values.

The new copolyesters are produced by the known method. The polyester forming derivatives of aromatic dicarboxylic acids can of course be employed as well as the acids themselves, for example their lower alkyl esters bearing 1 to 4 carbon atoms, or their aryl esters or acid halides. The usual catalysts are employed, e.g. metals, metal mixtures or alloys, the oxides or salts of boric acid, phosphorous acid or lower aliphatic carboxylic acids having up to 6 carbon atoms in the molecule. The manganese, cobalt, zinc, cadmium and lead salts of these acids are highly suitable catalysts, e.g. manganese tetraborate, cobalt acetate, zinc and lead oxides. A further desirable addition is a stabilizer, most of which are inorganic or organic phosphorus compounds; examples are triphenyl phosphine, tridodecyl phosphine, diphenylanthracene phosphine, magnesium hypophosphite and disodium phosphate.

The monomer mixture is polycondensed preferably under pure nitrogen in two stages in the presence of catalysts and, when required, stabilizers; in the first stage polycondensation proceeds under normal or increased pressure at temperatures up to 270° C. and in the second stage under reduced pressure at about 250° to 320° C.

The resulting copolymer melt may be processed immediately in the form of fibre, filament, film or some other moulded product. If desired it can be mixed with others of the new copolyesters or with known polyesters, copolyesters or other polymers, in the melted state if preferred, and the mixture subsequently processed. Alternatively two different polyesters can be extruded through twin nozzles to form what are known as bicomponent fibres. The commonly used additives may be incorporated in the copolymer during processing or earlier during the actual copolymerization reaction; examples of such additives are carbon black, organic and inorganic coloured pigments, plasticizers, optical brightening agents, and delustrants such as titanium dioxide and silicon dioxide.

Since the relative proportions of the starting products, notably components (c) and (d), may be varied over an appreciable range, it is possible to obtain copolyesters with physical properties such as tenacity, elongation and shrinkability that are aligned to given requirements. The pilling resistance is very good since the abrasion resistance is lessened by the slight extent of cross linking and the adjustable brittleness of the copolyesters, and the dyeing behavior is of an equally good standard. The new copolyesters are therefore used with special advantage for the production of pilling resistant filament and fibre types with improved dyeability, the fibres being particularly valuable for blending with cotton or wool while the filaments are highly suitable for the production of woven fabrics and knit goods and for conversion into texturized yarns. These copolyesters are further suitable for spinning shrinkable filaments and fibres such as are used for high bulk yarns and non-woven fabrics, for extrusion as sheets or films, particularly shrinkable films for packaging, and for processing in like manner to other thermoplastic products.

In the following examples the parts and percentages are by weight and the temperatures in degrees centigrade. The intrinsic viscosity was determined by measuring solutions of 1 gram of the copolyester in 100 milliliters of a 1:1 mixture of phenol and tetrachlorethane.

EXAMPLE 1

A mixture of 5000 parts of terephthalic acid dimethylester, 3996 parts of ethylene glycol, 815 parts of bis-phenol-A-diglycolether, 23.7 parts of glycerol, 1 part of zinc oxide and 0.8 part of triphenylphosphine is heated with stirring in a pure nitrogen atmosphere. Within 3½ hours, as the temperature increases to 240°, the methanol and ethylene glycol distill over. Subsequently stirring is continued at 0.8–0.4 mm. Hg and 268–271° and after 3 hours a virtually colourless copolyester is obtained which has an intrinsic viscosity of 0.63 and melts at 233–234°.

The copolyester can be converted into filament in an extrusion spinning machine and the filament cold drawn 1:4.5 in relation to its initial length. The tenacity of the filament is then 3.9 p./den., the elongation 14.4% and the linear shrinkage after boiling in water for 30 minutes without tension 13.8%. Following treatment in dry air at 160° at constant length and subsequent boiling in water for 30 minutes its tenacity is 3.8 p./den., the elongation 16.6%, the initial modulus 1.1 p./den. at 2% elongation, and the linear residual shrinkage before boiling 3.5%. The omission of glycerin in the starting mixture results in appreciably higher residual shrinkage. The shape stability is thus clearly superior to that of a copolyester containing no glycerin but otherwise identical. The filaments and fibres show lower abrasion resistance and are therefore well resistant to pilling.

EXAMPLE 2

The operating procedure of the foregoing example is followed using a mixture of 5000 parts of terephthalic acid dimethylester, 3996 parts of ethylene glycol, 815 parts of bis-phenol-A-diglycolether and 7 parts of pentaerythrite. The resulting product is a copolyester which has an intrinsic viscosity of 0.59 and melts at 234–236°. The spun filament, after drawing to the ratio 1:4.5, has a tenacity of 3.9 p./den., while the elongation at break is 7% and the linear shrinkage 18%. After heat treatment the tenacity is 3.6 p./den., the elongation at break 13.8%, the initial modulus 1.05 p./den. at 2% elongation and the residual shrinkage before boiling 4%. It shows substantially better shape stability than the analogous copolyester containing no pentaerythritol. Filament spun from a a copolymer containing 0.2% pentaerythritol but no bis-phenol-A-diglycolether has poorer drawability and hence lower tenacity. The stress-strain curve of the undrawn filament shows that no significant setting takes place at this stage. Hence the tenacity and elongation values for the filament prior to heat treatment are values of the yield point.

EXAMPLE 3

Polycondenstion is effected, again as detailed in Example 1, with a mixture of 3880 parts of terephthalic acid dimethylester, 3100 parts of ethylene glycol, 316 parts of bis-phenol-A-diglycolether and 1.36 parts of pentaerythritol, with the further addition of 0.39 part of zinc dust as catalyst. The resulting copolyester has an intrinsic viscosity of 0.70 and melts at 243–245°. When drawn 1:4 in relation to its initial length, the spun filament has a titre tenacity of 6.55 p./den. and its elongation at break is 7.6% and its shrinkage value at the boil 12.5%. After exposure for 30 minutes in dry air at 160° at constant length and subsequent treatment for 30 minutes in boiling water in the relaxed state, its titre tenacity is 5.89 p./den., the elongation at break 14.6% and the initial modulus 1.10 p./den. at 2% elongation.

EXAMPLE 4

A mixture of 3880 parts of terephthalic acid dimethylester, 3100 parts of ethylene glycol, 158 parts of bis-phenol-A-diglycolether and 2.73 parts of pentaerythritol is reacted according to the procedure of Example 3 to yield a copolyester which has an intrinsic viscosity of 0.76 and melting point 253–254°. This is spun and the filament drawn to the ratio 1:4.5. It then has a titre tenacity of 5.30 p./den., 12.2% elongation and 11.8% relative linear shrinkage at the boil. After heat treatment as detailed in Example 3 the titre tenacity is 5.15 p./den., the elongation at break 17.4% and the initial modulus 1.12 p./den. at 2% elongation.

EXAMPLE 5

When the ethylene glycol used in Example 3 is replaced by 7000 parts of 1,4-bis-(hydroxymethyl)-cyclohexane, a copolyester with similarly good properties is obtained.

EXAMPLE 6

Similar copolyesters are obtained when trimellitic acid and trimethylester or pyromellitic acid tetramethylester is employed in place of the pentaerythritol used in Examples 2, 3 and 4.

Having thus disclosed the invention what we claim is:

1. A thermoplastic copolyester composed of the reaction product of aromatic dicarboxylic acids selected from the group consisting of terephthalic, isophthalic, 2,6-naphthalene dicarboxylic, 4,4'-diphenyl-dicarboxylic, 2,5-dimethoxyterephthalic acid (a), of aliphatic or alicyclic dioles (b), up to 40 mol percent of an oxalkylation product of compounds having two phenolic hydroxyl groups in the molecule of formula

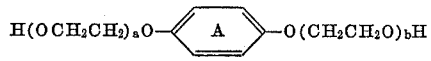

or

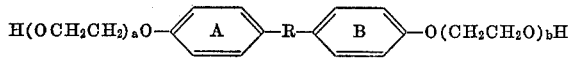

where $a$ and $b$, independently of each other, are whole numbers from 1 to 10, R stands for the direct linkage, a divalent saturated aliphatic hydrocarbon group having 1 to 6 carbon atoms, and a divalent saturated cycloaliphatic hydrocarbon group of 5 to 7 carbon atoms, a radical of formula

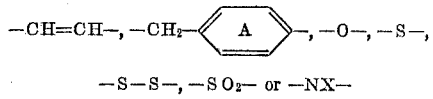

—S—S—, —SO$_2$— or —NX— the nuclei A and B may be substituted by lower alkyl, halogen or nitro and X stands for hydrogen or lower alkyl, (c), and up to 3 mol percent of a compound (d) selected from the group consisting of aliphatic alcohols having 3 or 4 hydroxyl groups and aromatic tricarboxylic or tetracarboxylic acids, the amounts in each case in relation to the aromatic dicarboxylic acids (a).

2. A copolyester according to claim 1, which contains as compound (b) a member selected from the group consisting of aliphatic dioles of the formula $$HO(CXY)_nOH$$

wherein X and Y, independently of each other stand for hydrogen or lower alkyl and $n$ is a whole number from 2 to 10, or alicyclic dioles.

3. A copolyester according to claim 1 which contains as compound (a) terephthalic, isophthalic or 2,6-naphthalene dicarboxylic acid or mixture thereof.

4. A copolyester according to calim 1 which contains as compound (b) ethylene glycol, 1,4-butanediol, 1,2-propanediol or 2-methyl-pentandiol-1,5 or 1,4-bis-(hydroxymethyl)-cyclohexane or mixture thereof.

5. A copolyester according to claim 1 which contains as compound (c) bis-phenol-A-diglycolether.

6. A copolyester according to claim 1 which contains as compound (d) at least one member selected from the group consisting of trimellitic acid, pyromellitic acid, glycerol, erythritol, pentaerythritol, arabitol, mannitol, sorbitol, malic acid, citric acid, tartaric acid.

7. A copolyester according to claim 1, composed of the reaction product of terephthalic acid, ethylene glycol or 1,4-bis - (hydroxymethyl)-cyclohexane, bis-phenol-A-diglycolether and pentaerythritol.

References Cited

UNITED STATES PATENTS

| | | | |
|---|---|---|---|
| 2,686,164 | 8/1954 | Arvin et al. | 260—22 |
| 3,214,491 | 10/1965 | Stanton | 260—871 |
| 3,345,329 | 10/1967 | Sommer et al. | 260—47 |
| 3,397,254 | 8/1968 | Wynstra et al. | 260—835 |

WILLIAM H. SHORT, Primary Examiner

L. M. PHYNES, Assistant Examiner

U.S. Cl. X.R.

260—37, 49